(12) United States Patent
Krolak et al.

(10) Patent No.: US 10,236,817 B2
(45) Date of Patent: Mar. 19, 2019

(54) INTEGRATED CONTROL ARCHITECTURE AND METHOD FOR A BI-DIRECTIONAL AC-TO-AC CONVERTER

(75) Inventors: Matthew Joseph Krolak, Renton, WA (US); Lijun Gao, Renton, WA (US); Shengyi Liu, Sammamish, WA (US)

(73) Assignee: THE BOEING COMPANY, Chicago, IL (US)

(*) Notice: Subject to any disclaimer, the term of this patent is extended or adjusted under 35 U.S.C. 154(b) by 785 days.

(21) Appl. No.: 13/294,597

(22) Filed: Nov. 11, 2011

(65) Prior Publication Data
US 2013/0123989 A1 May 16, 2013

(51) Int. Cl.
| | | |
|---|---|---|
| H02K 7/00 | (2006.01) | |
| H02P 27/08 | (2006.01) | |
| H02P 9/02 | (2006.01) | |
| H02P 21/30 | (2016.01) | |

(52) U.S. Cl.
CPC .............. *H02P 27/08* (2013.01); *H02P 9/02* (2013.01); *H02P 21/30* (2016.02)

(58) Field of Classification Search
CPC ........... H02K 7/025; H02K 7/02; H02M 1/12; H02M 2001/0077
USPC .................. 700/291, 286, 297; 701/3, 22
See application file for complete search history.

(56) References Cited

U.S. PATENT DOCUMENTS

| | | | | |
|---|---|---|---|---|
| 4,309,620 A | * | 1/1982 | Bock ............................. 290/4 R | |
| 4,520,681 A | * | 6/1985 | Moore ...................... G01L 3/12 | 73/862.28 |
| 4,745,799 A | * | 5/1988 | Kawarabayashi et al. .................. | 73/116.06 |
| 4,971,522 A | * | 11/1990 | Butlin ................... E21B 43/127 | 318/808 |
| 5,767,591 A | * | 6/1998 | Pinkerton ....................... 307/64 | |

(Continued)

FOREIGN PATENT DOCUMENTS

| | | |
|---|---|---|
| DE | 102010023536 A1 | 12/2011 |
| WO | 2010003469 A1 | 1/2010 |

OTHER PUBLICATIONS

Idjdarene et al., Direct Torque Control Strategy for a variable speed wind energy conversion system associated to a flywheel energy storage system, 2009 Second International Conference on Developments in esystems Engineering.*

(Continued)

*Primary Examiner* — Mark A Connolly
(74) *Attorney, Agent, or Firm* — Patterson + Sheridan, LLP (57) ABSTRACT

A method and system for controlling power transfer includes the operations of receiving a power transfer value indicating a power level to be transferred either to or from an energy storage sub-system and receiving an input comprising a rotational speed of a rotating mass in the energy storage sub-system. The operations further include calculating a torque value corresponding to the power transfer value based on the rotational speed of the rotating mass and determining whether the torque value exceeds a maximum allowed torque. The operations further include defining an adjusted torque value as the maximum allowed torque value if the torque value exceeds the maximum allowed torque value or defining the adjusted torque value as the torque value if the torque value does not exceed the maximum allowed torque value, and providing the torque value to a direct torque controller for controlling the torque of the rotating mass.

20 Claims, 7 Drawing Sheets

(56) References Cited

U.S. PATENT DOCUMENTS

| | | | | |
|---|---|---|---|---|
| 5,939,798 A * | 8/1999 | Miller | 307/64 |
| 5,994,794 A * | 11/1999 | Wehrlen | 307/66 |
| 6,118,678 A * | 9/2000 | Limpaecher et al. | 363/60 |
| 6,134,124 A * | 10/2000 | Jungreis et al. | 363/34 |
| 6,639,370 B1 * | 10/2003 | Gabrys | 318/161 |
| 6,657,320 B1 * | 12/2003 | Andrews et al. | 307/64 |
| 7,456,537 B1 * | 11/2008 | Kascak et al. | 310/90.5 |
| 7,667,418 B2 * | 2/2010 | Kascak et al. | 318/400.02 |
| 2008/0088183 A1 * | 4/2008 | Eckroad et al. | 307/66 |
| 2010/0156219 A1 * | 6/2010 | Wang | 310/90.5 |
| 2011/0043273 A1 | 2/2011 | Blasko | |

OTHER PUBLICATIONS

Wikipedia, "Direct Torque Control," http://en.wikipedia.org/wiki/Direct_torque_control accessed Sep. 22, 2011.

Fernandez, A. et al., "Modeling of an AC-to-DC Converter with a Single-Stage Power Factor Corrector," IEEE Transactions on Industrial Electronics, vol. 55, No. 8, Aug. 2008, pp. 3064-3076.

Kolar, J.W. et al., "Design and Experimental Investigation of a Three-Phase High Power Density High Efficiency Unity Power Factor PWM (VIENNA) Rectifier Employing a Novel Integrated Power Semiconductor Module," Conference Proceedings of Applied Power Electronics Conference and Exposition, vol. 2, pp. 514, 1996.

Zuckerberger, A. et al., "Single-Phase Matrix Converter," IEEE Proc.—Electr. Power Appl., vol. 144, No. 4, Jul. 1997.

Combined Search and Examination Report for App No. GB1220178.6 dated May 28, 2013.

* cited by examiner

INTEGRATED CONTROL ARCHITECTURE AND METHOD FOR A BI-DIRECTIONAL AC-TO-AC CONVERTER

BACKGROUND

One issue associated with using alternative energy sources is the ability to store currently produced energy for later use. Alternative energy sources, such as solar cells or wind farms, often provide energy at certain peak times during each day. For example, solar cells only produce energy during daylight hours, and wind conditions usually peak at certain times of the day or vary according to weather conditions. Demands for energy, on the other hand, may peak at other times. Thus, energy produced by alternative energy sources may not coincide with energy demand.

Technologies for storing energy are known to those skilled in the art. One approach is to convert electrical energy into various forms of mechanical or potential energy, and recover the energy by converting the mechanical back into electrical energy when needed. For example, one storage approach involves using electricity to pump water into a reservoir. At a later time, the water can be released through a turbine to generate electricity by turning a generator. A typical device to perform electrical to mechanical power conversion is a motor, and a typical device to perform mechanical to electrical power conversion is a generator. In some cases, a motor and a generator may be the same device functioning as a motor (in a "motor mode") to turn a pump and later functioning as a generator (in a "generator mode") when electrical energy is to be extracted. In another example, the motor/generator uses electricity in the motor mode to spin a flywheel at a high speed. When electricity is needed, the mechanical energy of the flywheel is tapped to turn the motor/generator in a generator mode to produce electricity.

These approaches are sometimes referred to as "time shifting" of energy production, since generating electrical energy occurs at a different time from when it is used. In various applications, the time shifting period may vary from a fraction of a second to several hours, or more. In the above example of pumping water to a reservoir during off-hours to store energy, the time shifting may be several hours, days, or even longer. In another example where energy is stored to compensate for power outages, an energy storage source may be immediately tapped for power upon request. For example, transient voltage variations, such as short duration (from milliseconds to seconds), long duration (from seconds to minutes), sustained voltage sags (>minutes), and interruptions can occur within the power grid. In any case, the effects can be ameliorated by rapidly accessing a temporary energy storage source. An energy storage facility may be storing energy from an electrical source one second, and then may be required to provide energy the next second. Thus, it is desirable that such systems provide a fairly quick response from storing energy to providing energy.

It is with respect to these and other considerations that the disclosure herein is presented.

SUMMARY

It should be appreciated that this Summary is provided to introduce a system for more efficient and faster control of an energy storage system that stores energy by converting electrical energy into mechanical energy and vice versa. A selection of concepts in a simplified form are further described below in the Detailed Description. This Summary is not intended to be used to limit the scope of the claimed subject matter.

In one embodiment disclosed herein, a method for controlling power transfer includes the operations of receiving a power transfer value indicating a power level to be transferred either to or from an energy storage sub-system and receiving an input comprising a rotational speed of a rotating mass of the energy storage sub-system. The operations further include calculating a torque value corresponding to the power transfer value based on the rotational speed of the rotating mass and determining whether the torque value exceeds a maximum allowed torque. The operations further include defining an adjusted torque value as the maximum allowed torque value if the torque value exceeds the maximum allowed torque value and as the torque value if the torque value does not exceed the maximum allowed torque value, and providing the torque value to a direct torque controller for controlling the torque of the rotating mass.

In another embodiment disclosed herein, a system for controlling transfer of power between an AC energy source and an energy storage sub-system includes a direct power controller for controlling energy transfer associated with the AC voltage source and a direct torque controller for controlling energy transfer associated with the energy storage sub-system comprising a rotating mass. The system further includes a system controller comprising a processor configured to receive a power command indicating an amount of power to be transferred, receive a rotational speed of the rotating mass, calculate a limited active power reference signal, and provide the limited active power reference signal to the direct torque converter. The processor is further configured to determine an adjusted active power reference signal based on the limited active power reference signal, and provide the adjusted active power reference signal to the direct power controller.

In another embodiment disclosed herein, a computer readable medium stores instructions that when executed cause a processor to receive a power transfer value indicating a power level to be transferred either to or from an energy storage sub-system and an energy source, receive a rotational speed value of a rotating mass, and calculate an active power reference value. The instructions further cause the processor to provide the active power reference value to a direct torque controller controlling a rotating mass-based power storage system and provide an adjusted active power reference value based on the active power reference value to a direct power controller controlling power transferred with the rotating mass-based power storage system.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a control system for an energy storage system. In one embodiment disclosed herein, the power source is a conventional AC power source sometime referred to as the "AC grid" that comprises one or more interconnected generators, and the electrical energy from the AC power source is converted by a motor/generator providing torque to a flywheel. The energy from the AC power source is essentially stored as a form of mechanical energy manifested by the flywheel spinning. The energy flow can be reversed and energy can be extracted from the spinning flywheel by the motor/generator to provide AC power as required. Although illustrated in terms of a flywheel based energy storage system, the concepts disclosed herein are not limited to such embodiments, and could be applied to other embodiments. For example, a backup power system or uninterruptable power supply system could incorporate and benefit from the concepts disclosed herein.

In one embodiment of an energy storing sub-system comprising a motor/generator and flywheel, the motor/generator functions as a motor (in a motor mode) to convert electrical energy into mechanical energy by imparting torque on the flywheel. The motor/generator then functions as a generator (in a generator mode) to extract energy from the flywheel. The torque provided by the flywheel provides mechanical power to the generator to generate electrical power. The extraction of energy will eventually cause the flywheel to spin down.

In one embodiment, the flywheel may be a rotating mass suspended by magnetic bearings in a vacuum chamber and rotating at a relatively high speed (e.g., 20,000 rpm). The transfer of energy must be limited and controlled. The rotation speed of the flywheel may be limited by mechanical design factors such as bearing speed, heat dissipation, mechanical stability, rotor strength, etc. Extracting too much energy too quickly (i.e., a very high power) from the flywheel can result in a large generator current that can exceed or impact the above design parameters and potentially cause damage to the system.

Figure 1A:
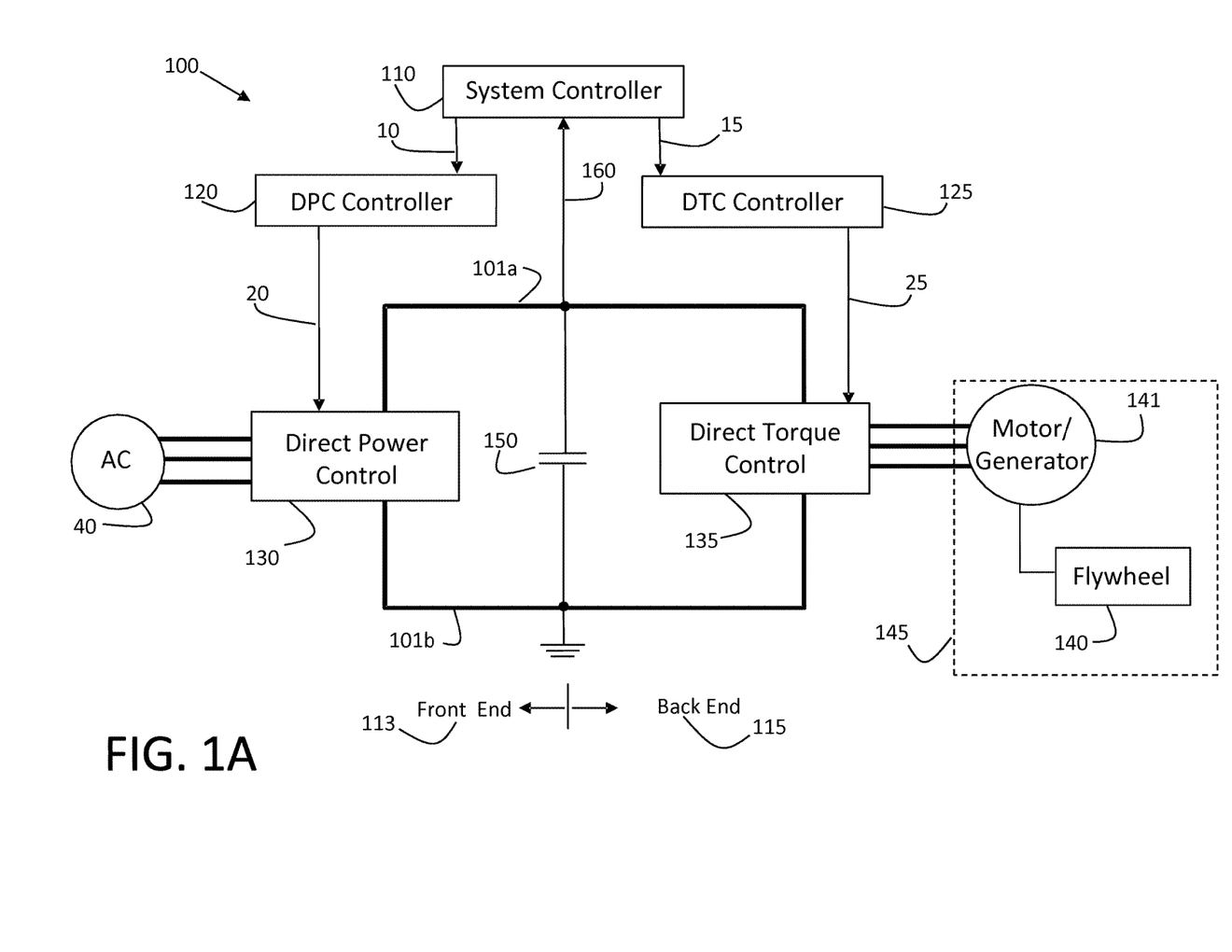
FIGS. 1A and 1B illustrate a schematic view of the energy storage system including the system controller, direct power controller, and direct torque controller according to one embodiment disclosed herein.

One embodiment for illustrating the concepts is provided in FIG. 1A. FIG. 1A shows components of an energy storage system 100 comprising an AC power source 40 providing energy in the form of conventional 3-phase electricity. The power source could be a conventional power grid where one or more power generation plants such as a gas or coal-fired generation plant, or any other source that provides electrical energy. The AC power source may also be referred to herein generally as a "source" or "energy source" that provides energy for storage.

A direct power control ("DPC") 130 functions to convert the AC voltage into a DC voltage, and may also regulate the net reactive power flow to be substantially zero. The DC voltage is then provided to DC links 101a, 101b. The DC links 101a, 101b provide a DC voltage to the direct torque control ("DTC") 135 which in turn inverts the DC power to provide AC power. The DTC regulates power provided to an energy storage sub-system 145 comprising a motor/generator 141 and flywheel 140. The motor/generator 141 when functioning as a motor consumes electrical energy to rotate a flywheel 140 thereby converting electrical energy into mechanical energy. The energy storage sub-system, when consuming energy from the energy source, is referred to as an "energy sink" or simply "sink."

A DC link capacitor 150 is present across the DC links 101a and 101b, and functions to filter out voltage ripples, and to provide an energy buffer when the voltage across the DC links 101a and 101b drops. The voltage across DC links 101a and 101b voltage can vary when the energy storage system changes modes, e.g., the energy store sub-system 145 is tapped to provide energy, which is supplied back into the grid or AC power source 40. In the illustration of FIG. 1A, the system 100 is in the energy storage mode when the motor/generator 141 is in the motor mode, and in the energy retrieval mode when the motor/generator 141 is in the generator mode.

For reference purposes, the "front end" 113 refers to the left portion of FIG. 1A comprising the DPC 130 and the AC power source 140. The "back end" 115 refers to the right side portion comprising the DTC 135, motor/generator 141, and flywheel 140. The front end is typically the primary source of energy that is to be stored in the sink of the backend. For reference purposes herein, the front end 113 will still refer to the left side of the diagram even when energy storage mode changes, e.g., energy is being provided by the energy store 145 to the AC power source 40. It will be clear from the context which mode the system is in at a given time.

In the system shown in FIG. 1A, the System Controller 110 provides a DPC control signal 10 and a DTC control signal 15 to the DPC Controller 120 and the DTC Controller 125 respectively. The DPC Controller 120 in turn provides a control signal 20 to the DPC 130. The DTC Controller 125 provides a control signal 25 to the DTC 135.

In operation, the power consumed from the AC power source 40 is controlled by the System Controller 110, which in turn controls the DPC Controller 120. The transfer of the active and reactive power from the AC power source 40 is regulated by the DPC Controller 120. The System Controller 110 also controls the DTC Controller 125 so that the power stored in the energy storage sub-system 145 is the same as the power consumed from the AC power source 40. During the energy storage mode when the motor/generator 141 is in the motor mode and energy is being stored into the energy storage sub-system 145, the DTC 135 functions as an inverter converting DC voltage into an AC voltage to drive the motor by performing a direct torque control method.

When the mode of operation changes to energy retrieval, i.e., when the motor/generator 141 is in the generator mode, power is tapped from the energy storage sub-system 145, the functions provided by the DTC 135 and DPC 130 essentially switch. Specifically, the DTC 135 acts as a converter to convert AC to DC, and the DPC 130 then functions as an inverter to convert DC to AC, which is supplied back into the grid. In the energy retrieval mode, the DPC controls power provided to the grid and the DTC controls energy extracted from the flywheel. Further, in the energy retrieval mode, the motor/generator 141 functions as a generator.

The DC link capacitor 150 serves to buffer any differences in the energy consumed and provided, regardless of which mode of operation presently occurs. In general, the smaller the differences between the energy consumed and provided (e.g., between the DTC and DPC), the smaller the value required of the DC link capacitor 150. The voltage of the DC link capacitor 150 is monitored by the System Controller via input 160.

Figure 1B:
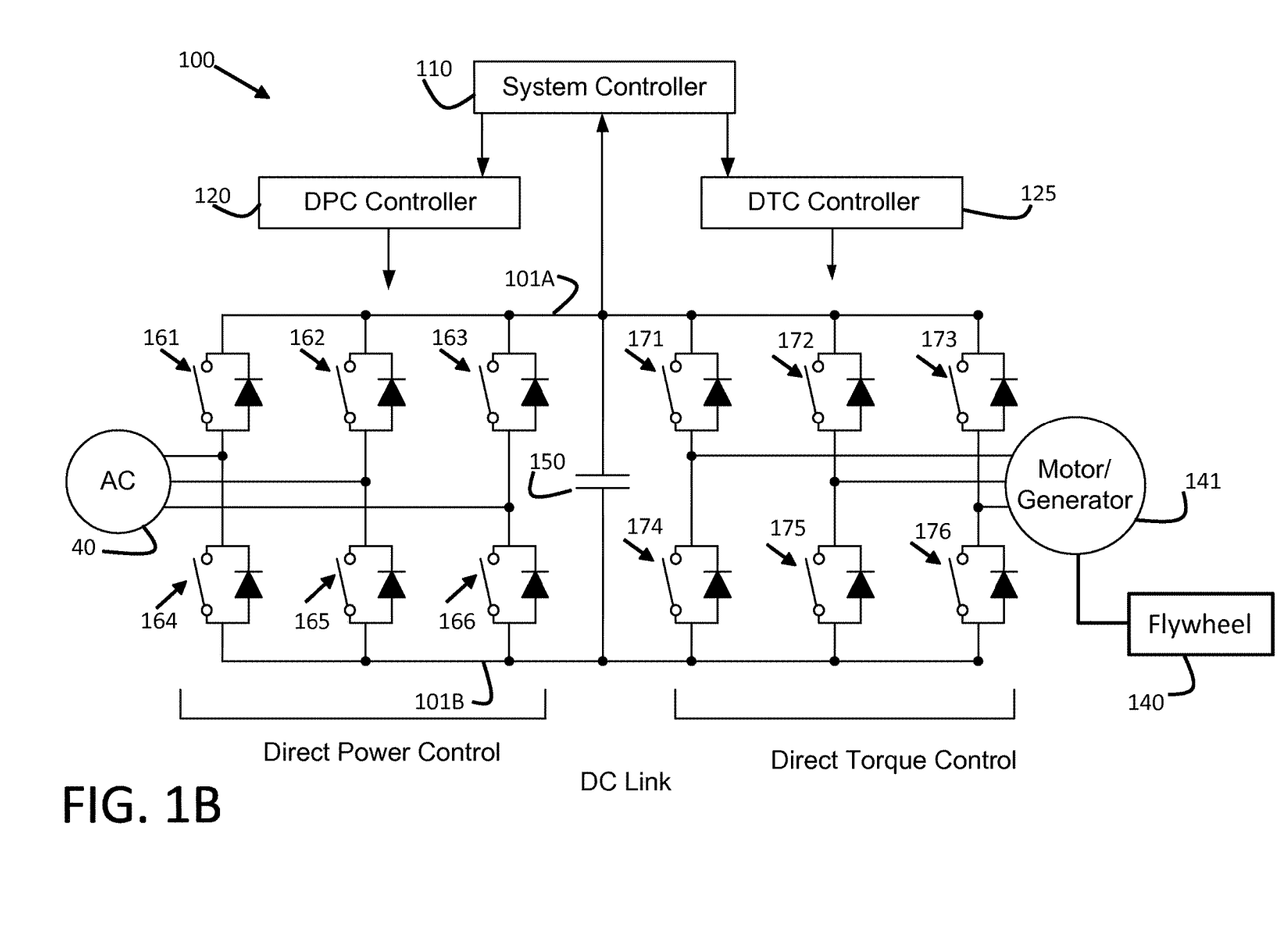

FIG. 1B illustrates example circuitry of the DPC 130 and DTC 135 of the system shown in FIG. 1 in greater detail. Each of the DPC 130 and DTC 135 comprises six switching assemblies 161-166 and 171-176. The front end switch assemblies 161-166 are operated by the DPC Controller 120 and the back end switch assemblies 171-176 are operated by the DTC Controller 125. Although a single control line is shown emanating from the DPC Controller 120 and DTC Controller 125 respectively, those skilled in the art will recognize that multiple control lines would emanate and control each of the individual switches on the front end or back end respectively.

Using the front end switch assemblies 161-166 as an example, a series of switch assemblies 161-166 are selectively activated (e.g., closed or ON) and deactivated (e.g., opened, or OFF) to regulate the conversion of AC power to DC power and control the level of power drawn from the AC power source 40. These switches are controlled by the DPC Controller 120 to ensure that the appropriate level of power is provided. The DPC Controller 120 may measure the instantaneous levels of both active (real) and reactive (imaginary) power using sensors (not shown in FIG. 1B) on each of the phases of AC power. The control of the switches may be accomplished in part by comparing measured values of the direct and quadrature axis power at various measurement points with reference values of power, and determining the appropriate switching vector to apply to switch assemblies 161-166 to adjust the power transferred between the front end and the back end.

The DC power is then provided to the DC links and then to the back end switch assemblies 171-176, which are selectively activated by the DTC Controller 125 so as to regulate the power consumed. The System Controller 110 ensures the same level of active and reactive power is consumed as is generated. The DTC Controller 125 determines the switching vector to ensure that the power provided and the power consumed are the same. For purposes herein, reference to the "same" power does not necessarily require the same exact values, but can mean within a few percent. Within any system there are intrinsic measurement inaccuracies, inherent system parameters, energy losses, etc.

By minimizing the differences in energy consumed and energy provided, the DC link capacitor 150 can be smaller in value since the energy buffering requirements between the energy source and energy sink are smaller. It is desirable that the DC link capacitor 150 be kept small in value, which reduces the volume, weight, and cost of the overall system. The DC link capacitor 150 is also a vulnerable point in the system, and requiring a smaller DC link capacitor value that allows greater flexibility in the selection of the types of capacitors that can be used, such as a "film" type capacitor with a lower energy density compared to, for example, an aluminum electrolytic capacitors.

The DC electrical power is inverted to AC power and except for negligible loss amounts, the energy is then stored in the form of mechanical energy in the flywheel 140. One such negligible energy loss may be energy consumed as flux in the rotor, if the motor/generator is an induction motor. In other embodiments, the motor/generator 141 may be a permanent magnet synchronous motor; hence, there is no flux is generated by energizing the rotor as occurs in an induction motor.

The System Controller 110 coordinates the operation of the DPC Controller 120 and the DTC Controller 125. The System Controller 110 uses a power command signal (not shown in FIG. 1B) that indicates the amount of power to be transferred, and in which direction. For example, the System Controller 110 can direct that power from the AC power source 40 be drawn and consumed by the energy storage sub-system 145. However, when necessary, the System Controller 110 can direct that power be drawn from the energy storage sub-system 145 and provided to the AC power source 40. Hence, the power command signal can also be referred to as a power demand signal. This is accomplished by the System Controller 110 providing a power command signal indicating the amount of the power and which mode of operation should occur. For purposes of illustration, a positive power command signal indicates that power is drawn from the AC power source 40 and is provided to the energy storage sub-system, whereas a negative power command signals indicates that power is to be provided from the energy storage sub-system 145 to the AC power source 40.

The combination of the DPC 120 and the front end switch assemblies 161-166 form circuitry for managing the power in conjunction with the energy source shown as the AC power source 40. The DTC 125 and switch assemblies 171-176 form circuitry for managing the torque in the flywheel 140. In an ideal environment, the real power consumed from the AC power source 40 and converted into DC power would be equal to the DC power converted to mechanical energy by the motor 141 and flywheel 140.

Thus, the System Controller 110 is configured to manage power consumption and storage in terms of both electrical energy and mechanical energy. This will impact the operation of the System Controller 110 as will be seen.

Figure 2:
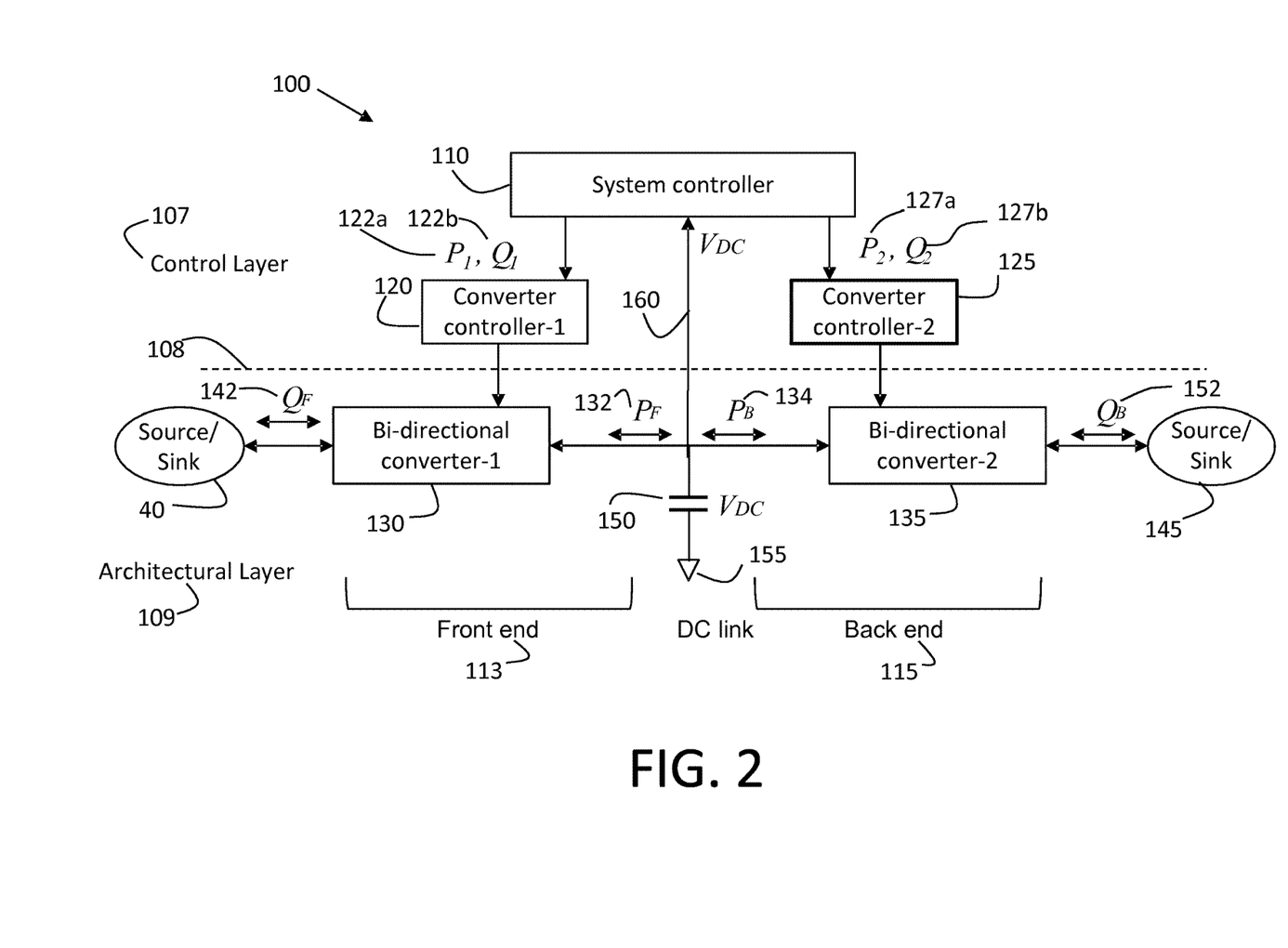
FIG. 2 illustrates a schematic view of the energy storage system depicting flow of reactive and active power according to one embodiment disclosed herein.

FIG. 2 shows a schematic of the power flow of the energy storage system 100 of FIG. 1A and FIG. 1B. FIG. 2 reflects that the source/sink 40 (corresponding to the AC power source 40 shown in FIG. 1A) could be a source or a sink of power depending on the mode of operation. Similarly, the energy storage sub-system 145 of FIG. 1A is depicted as a source/sink 145 in FIG. 2. At any given time, the AC power source 40 is a source/sink and the energy storage sub-system 145 is also a source/sink, but they operate in opposite modes. Specifically, if a given source/sink is a power source, the other source/sink is a power sink. Similarly, each of the bi-directional converter-1 130 and bi-directional converter-2 135 can operate to convert DC-to-AC or AC-to-DC depending on the mode of operation. For purposes of illustration of the power flow, these are referred to as bi-directional converters.

FIG. 2 illustrates the various power levels that have to be managed in order to ensure a balanced operation such that the power provided matches the power consumed. The power between the source/sink 40 and the bi-directional converter-1 130 involves AC voltage which is designated as $Q_f$ 142 and $P_f$ 132 for the reactive front end power and the active front end power respectively. Similarly, the power between the bi-directional converter-2 135 and the source/sink 145 is designated as $Q_b$ 152 and $P_b$ 134 for the reactive back end power and the active back power respectively. Between the bi-directional converter-1 130 and the bi-directional converter-2 135, a DC voltage exists so that only active power $P_f$ 132 and $P_b$ 134 have to be managed for the front end and back end respectively.

Finally, the System Controller 110 provides reference signals to the Converter Controller-1 120 and the Converter Controller-2 125 designated as $P_1$ 122a and $Q_1$ 122b for the desired active power and reactive power. Typically, the same value for $P_1$ 122a is provided as $P_2$ 127a to the Converter Controller-2. The same value are used because the System Controller 110 is designed to provide the same level of power supplied and the same level of power consumed. In some embodiments, the values of $P_1$ 122a and $P_2$ 127a may be slightly different because of inherent system losses, etc. In some embodiments, as will be seen, the System Controller 110 may not provide values for $Q_1$ and $Q_2$ or they may be set to zero. To the extent that $Q_1$ 122b and $Q_2$ 127b are provided, these may be the same value or slightly different. Finally, the System Controller 110 monitors the voltage across the DC link capacitor 150 via input 160, which can be used in controlling the overall system.

Figure 3:
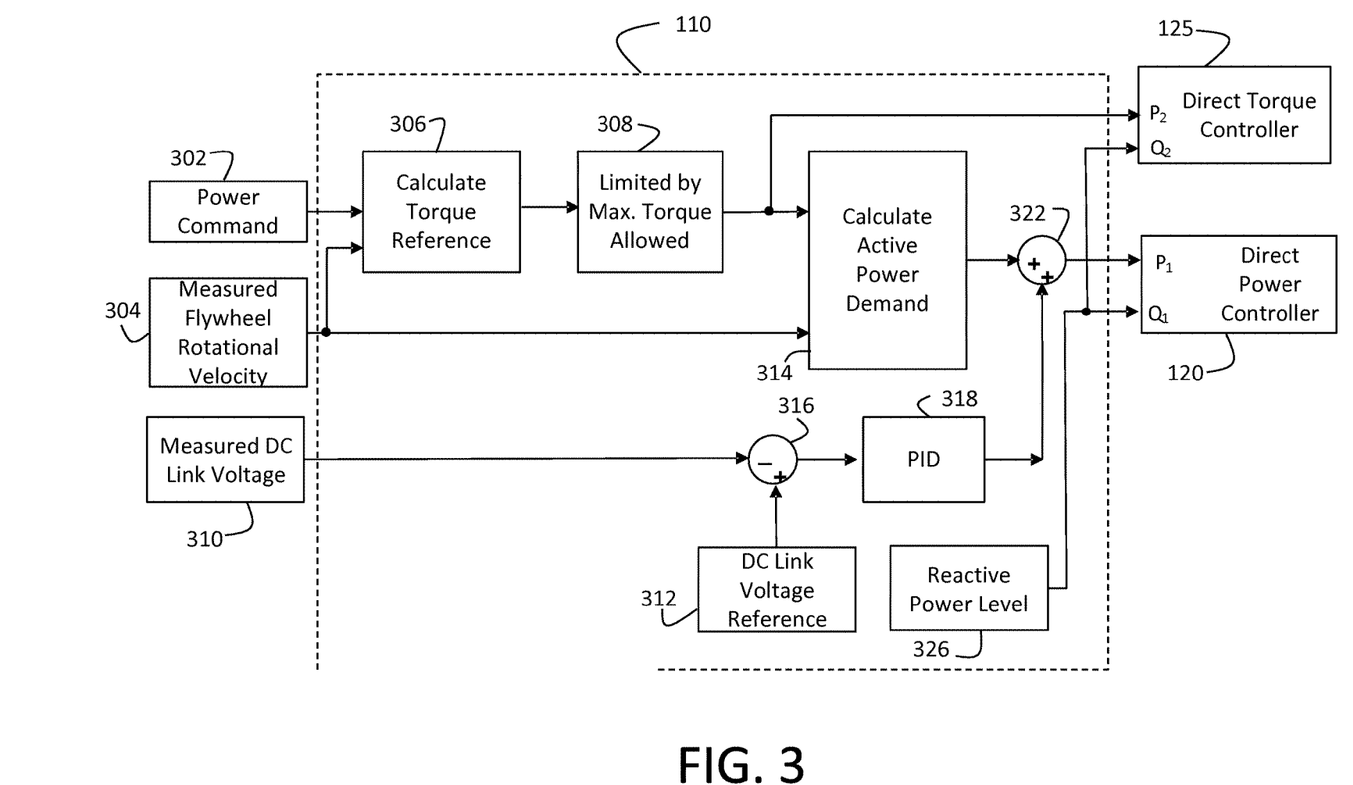
FIG. 3 illustrates a schematic view of the functions and the process flow occurring in one embodiment of the system controller according to one embodiment disclosed herein.

As shown in FIG. 3, the System Controller 110 can be illustrated in a functional block form. This diagram also illustrates the process flow that occurs with controlling the system. Explanation is provided in the context of extracting power from the energy storage sub-system 145.

The System Controller 110 receives various inputs, including a power command 302 input indicating a power transfer value that indicates how much power is to be extracted from, or provided to, the energy storage sub-system 145. In one embodiment, this value is a value measured in watts. The extraction of energy from the energy store may be in response to a low voltage condition on the grid, or other condition(s). The System Controller 110 may also receive an input of the measured flywheel rotational velocity or speed 304 of the flywheel 140. This can be estimated from the line currents and voltages, or could be measured through sensors. In other embodiments, this speed value can be estimated using electrical measurement values of line current and voltages, and then converting the values into appropriate mechanical energy measurement parameters. The System Controller 110 also receives the measured value of the DC link voltage 310 as an input.

The System Controller 110 generates a set of power signals $P_1$, $Q_1$ and $P_2$, $Q_2$. Typically, the values of $P_1$ and $P_2$ are the same value or very similar and denote the real power that is to be supplied or stored. The value of $Q_1$ may be set to zero, since it does not represent useful work. In some embodiments, the value for $Q_1$ may be a non-zero value to compensate for reactive power present on the AC power source 40 due to other reactive components. In some embodiments, $Q_2$ is also zero and/or not provided to the energy storage sub-system 145, or this value can be generated by the DTC. Thus, providing the output reference signal $Q_1$ and $Q_2$ is optional and may not be provided by the System Controller 110 in certain embodiments.

The output power signals $P_1$ 122a and $P_2$ 127a indicate how much power is to be provided or supplied based on the power command 302. If reactive power is desired on the grid at the front end or back end, it is managed separate from the power command 302. An example is provided illustrating a power command 302 requesting power to be supplied from the energy storage sub-system 145. It is assumed that the power command signal indicates a numerical value where the sign (positive or negative) indicates whether power should be stored or supplied. The exact convention used is not critical, but a positive power command value may indicate energy should be stored whereas a negative power command may indicate energy should be extracted. The value indicates the amount of energy to be supplied or stored. In one embodiment, this value corresponds to a value in watts.

In the function block 306, the received power command value expressed in watts is converted to a torque reference value. This is accomplished by using the formula shown in equation 1:

$$\text{Power} = (\text{angular velocity})(\text{torque})(2\pi) \qquad \text{(eq. 1)}$$

this can be rewritten as equation 2 below:

$$\text{Torque} = (\text{Power})/[(2\pi)(\text{angular velocity})] \qquad \text{(eq. 2)}$$

In equation 2, the torque is measured in Newton-meters (N·m), the angular velocity is measured in radians per second (rad/s), and the power is measured in watts (W). Since the power value is provided as an input value in watts from the power command 302 and the angular velocity may be provided as a measured or estimated input value 304, function block 306 provides a conversion of the amount of torque that must be attained at the current angular velocity to achieve the desired power output.

The torque value is then provided to function block 308. The amount of power requested to be supplied may be limited by other factors. For example, extracting too much power from the flywheel can exert gyroscopic forces that can cause the flywheel to wobble or exceed the rating of its magnetic bearings. Further, anytime energy is extracted from the flywheel, heat is generated due to various losses. Extracting too much energy from the flywheel too quickly (i.e., extracting too much power) may result in exceeding the thermal limits of the components, and can cause degrading of the component materials and subsequent system performance. Thus, the targeted torque level may be limited in function block 308 to a maximum level based on a system parameter.

Once the limited torque value is determined (which is a form of limited active power value), it is provided to the DTC 125 and to the function block 314. This value represents active power, $P_2$. Providing the value to the DTC 125 results in controlling the flywheel via the generator to achieve the target torque, thus extracting the requested power. The target torque value corresponds to active (real) power provided by the energy storage sub-system 145 that is compatible with the mechanical power measurement system.

The function component 314 also receives the limited torque value and multiplies this by the measured flywheel rotational speed to determine an active power demand that is converted back into a value of watts. While the limited torque value is suitable for controlling power in the mechanical flywheel system, this torque value is not suitable in its present form for controlling power in an electrical context. Specifically, the limited torque value reflects mechanical force (Newton-meters) and must be converted to reflect electrical power (watts). Thus, in function block 314 the torque value is converted into watts and provided to the summing module 322.

Summing module 322 adds an active power correction factor value to the limited torque (active power) value and provides the result as $P_1$, which is an adjusted active power value, to the DPC 120. The active power correction factor is based on an input 312 of the measured DC link voltage 160 and a reference DC link voltage 312. This provides a feedback loop for measuring the DC link voltage to determine if the DC voltage value is drifting over time from a target value due to inaccuracies, changing properties of the component materials, changing conditions, etc.

The output of summing module 316 is provided to a proportional-integral-derivative (PID) controller 318 that forms an active power correction value. The active power correction value adjusts the active power value from function block 314 over time to form the adjusted actual power value (i.e., $P_1$) provided to the DPC 120. Specifically, the active power value and the active power correction value are combined in the summing module 322 to provide the adjusted active power value that is provided to the DPC 120. The DPC and DTC controllers may produce or consume slightly different amounts of power in response to identical power commands, which is compensated by the PID 318. The PID 318 continually adjusts for any constant or varying offset between the two power levels, i.e., the power transferred between the DPC and DTC. Typically, the active power correction value is no more than a few percent of the overall active power value provided by function block 314.

The above summarizes how the active power is determined and used to control the power extracted from the energy storage sub-system and provided to the AC power grid. In addition, the reactive power reference signals may be determined as well. In one embodiment, the power command signal provided to the System Controller 110 can include a reactive power component that the System Controller 110 may use to generate a reactive power reference signal $Q_1$ to the DPC 120. In some embodiments, the reactive power reference signal may be provided by a reactive power level component 326 that provides a fixed reactive power reference value programmed into it based on system design parameters. The reactive power level 326 may be fixed and used to compensate for other portions of the system which may have reactive components. Other mechanisms may be employed by the reactive power level component 326 for determining the reactive power reference value.

In FIG. 3, the System Controller 110 outputs indicating the real power levels $P_1$ and $P_2$ are provided to the DPC 120 and DTC 125 respectively. The $P_1$ value provided to the DPC can be expressed in watts, which is conventional for electrical systems. The $P_2$ value provided to the DTC is also a power reference signal, but because the DTC involves a mechanical system, the power may be expressed in Newton-meters. The processes described above are continuously performed, so that the velocity and required torque values are continuously updated. Recall that as energy is converted from a mechanical form to an electrical form (e.g., electrical energy is generated from the flywheel's rotation), the rotational speed of the flywheel will decrease. Thus, it is necessary to continuously update and perform the indicated calculations and processing when extracting or storing energy from the flywheel as the rotational velocity is dynamic.

Figure 4:
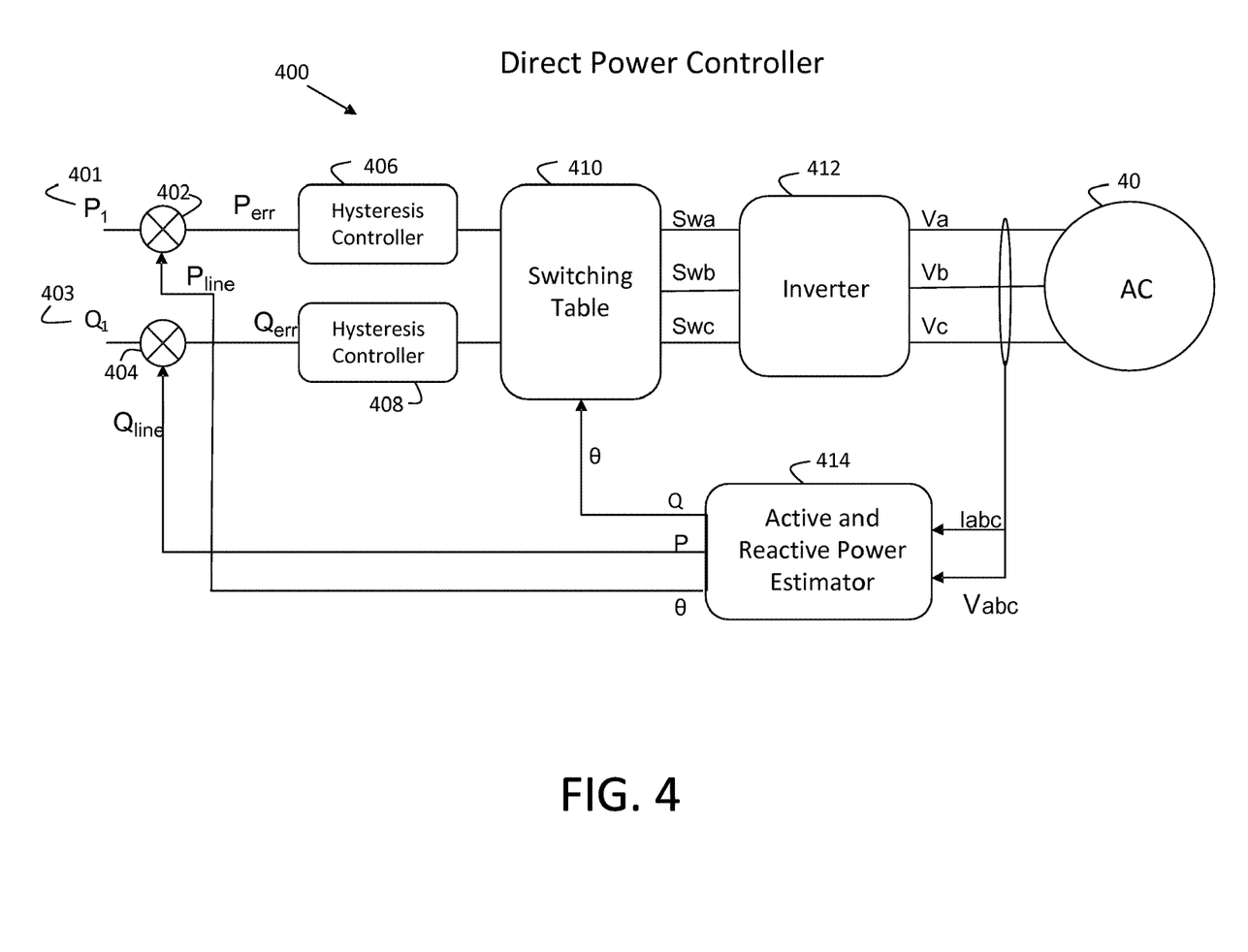
FIG. 4 illustrates a schematic view of the direct power controller according to one embodiment disclosed herein.

Once the corresponding signals for $P_1$, $Q_1$, and $P_2$, $Q_2$ signals are generated (to the extent that $Q_1$ and $Q_2$ are generated by the System Controller 110) the values are provided to the DPC 120 and the DTC 125 respectively. The circuitry for the DPC is shown in FIG. 4. In FIG. 4, the $P_1$ reference signal 401 is provided to a comparator 402, which compares an active line power value, $P_{line}$, with the $P_1$ signal to determine an active power error signal, $P_{err}$. This is provided to a hysteresis controller 406, which determines if the $P_{err}$ value is within an allowable band of operation. Similarly, the $Q_1$ value is compared with a measured reactive line power value, $Q_{line}$, and the resulting reactive power error signal $Q_{err}$ is provided to a separate hysteresis controller 408. Each of the hysteresis controllers 406, 408 provides a respective value to the switching table 410 that controls three pairs of switches. Each switch controls the set of switches for one of the phases (e.g., switch assemblies 161 and 164; 162 and 165; or 163 and 166). For illustration purposes, switch assemblies 161 and 164 can be considered as a set controlled by output Switch A, switch assemblies 162 and 165 can be considered as a set controlled by output Switch B, and switch assemblies 163 and 166 can be considered as a set controlled by Switch C. Whenever one switch in an assembly is ON, the other switch in that set is OFF. Thus, it is inappropriate to close (turn ON) both switches in a set at the same time. Specifically, do so, e.g., closing both switch assemblies 161 and 164, would short the DC links.

The switching table 410 also takes into account the relative phase angle as provided by an Active and Reactive Power Estimator 414 ("A/R Power Estimator"). The A/R Power Estimator 414 may measure current, phase angle and/or voltage inputs from the various phases Va, Vb, and Vc from the AC power source 40. From this, one or more relative phase angles can be determined and provided to the switching table 410.

The switching table 410 can comprise a microcontroller, microprocessor, programmable logic array, or some other type of controller that uses a table lookup for adjusting the reactive and active power for a set of phases based on the measured active power, reactive power, and phase angle. By selectively activating the switches, the power provided by the power source can be controlled.

Figure 5:
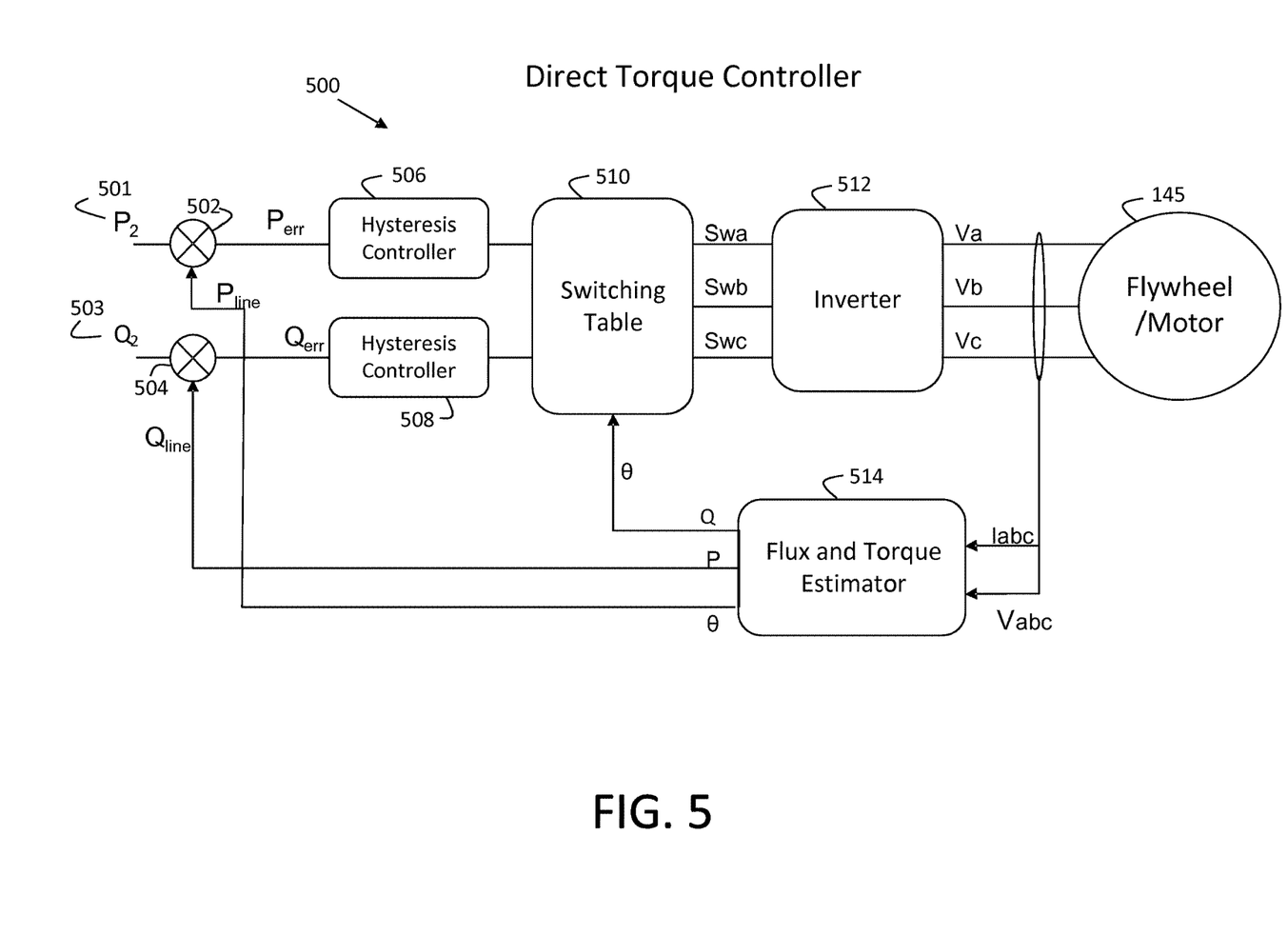
FIG. 5 illustrates a schematic view of the direct torque controller according to one embodiment disclosed herein.

The DTC 500 in FIG. 5 operates using similar principles. In FIG. 5, the active power signal, $P_2$ 501 is provided to a comparator 502. Although $P_2$ 501 represents a form of active power, it is provided in terms of Newton-meters. Once it is in this form, the value can be compared by comparator 502 with the active torque manifested on the line, $P_{line}$, to determine an active torque error signal, $P_{err}$. This is provided to a hysteresis controller 506, which determines if the value is within an allowable band of operation. Similarly, the $Q_2$ reference value is compared with the measured flux, $Q_{line}$, and the resulting reactive power error signal $Q_{err}$ is provided to a separate hysteresis controller 508. Each of the hysteresis controllers 506, 508 provides a value to the switching table 510, which controls three pairs of switches by ascertaining a switching vector. Each switch controls the set of switches for one of the phases (e.g., switch assemblies 171 and 174; 172 and 175; or 173 and 176).

The switching table 510 also takes into account the relative phase angles as provided by a Flux and Torque Estimator 514 ("F/T Estimator"). The F/T Estimator 514 may measure current, phase angle, and/or voltage inputs from the various phases Va, Vb, and Vc from the energy storage system 145 and estimates the flux and torque. The F/T Estimator 514 may provide one or more phase angle measurement values to the switching table.

The switching table 510 can be implemented using a microcontroller, microprocessor, programmable logic array, or some other type of controller that uses a table lookup for adjusting the reactive and active power for a set of phases based on the measured active power, reactive power, and phase angle. By selectively activating the switches, the power extracted from the flywheel can be controlled.

Figure 6:
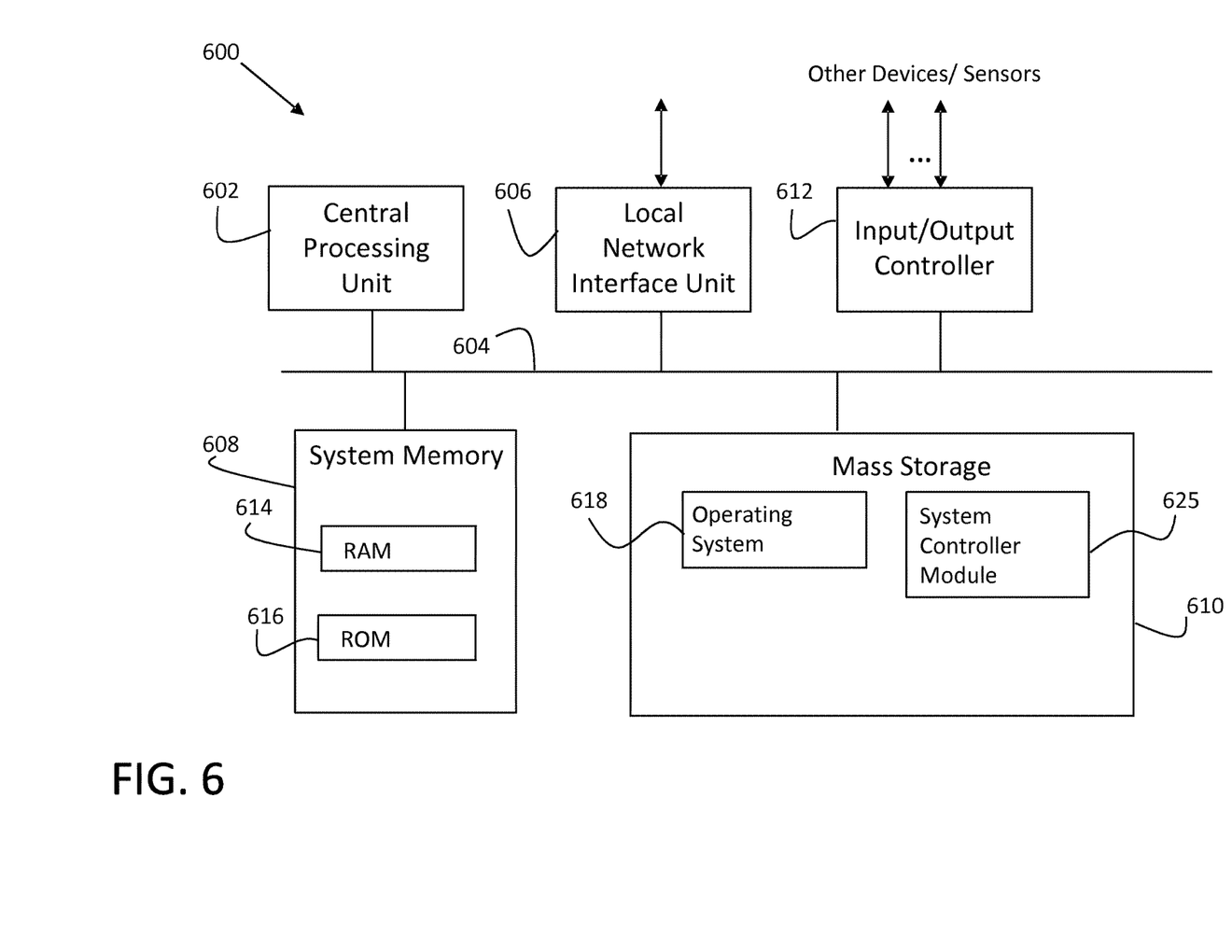
FIG. 6 illustrates one embodiment of the computer architecture for a system controller according to one embodiment disclosed herein.

The functional blocks and associated operations performed as indicated in FIG. 3, as well as for FIGS. 4 and 5, can be performed by a computing system with an architecture shown in FIG. 6. The computer architecture shown in FIG. 6 may include a central processing unit 602 (CPU), a system memory 608 including a random access memory 614 (RAM) and a read-only memory (ROM) 616, and a system bus 604 that couples the memory to the CPU 602. These components may be implemented using a system on a chip ("SOC"), a microcontroller based integrated circuit, a computer processing board with separate integrated circuits for these functions, or some other type of arrangement.

A basic input/output system containing the basic routines for transferring information between elements within the computer 600, such as during startup, is stored in the ROM 616. The computer 600 further includes a mass storage device 610 for storing an operating system 618, and the system controller module 625, and other related data. For example, the aforementioned reference values for the reactive power and DC link voltage may be stored in the mass storage device 610 as well.

The mass storage device 610 is connected to the CPU 602 through a mass storage controller (not shown) connected to the bus 604. The mass storage device 610 and its associated computer-readable media can provide non-volatile storage for the central processing unit 602. Although the description of computer-readable media contained herein refers to a mass storage device, such as a hard disk or CD-ROM drive, it should be appreciated by those skilled in the art that computer-readable media can be any available computer storage media, excluding transitory signals, which can be utilized by the computer 600.

By way of example, and not limitation, computer-storage media may include volatile and non-volatile, removable and non-removable media implemented in any method or technology for storage of information such as computer-readable instructions, data structures, program modules or other data. For example, computer-storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be utilized by the computer 600.

According to various embodiments, the computer 600 may operate in a networked environment using logical connections to other controllers or devices through a local area network controller unit 606. The central processing unit 602 may connect to via the bus 604 to the local network interface unit 606 to other systems or components, such as for example, to receive sensor values of a rotational velocity of the flywheel, a measured DC voltage link, or other values.

It should be appreciated that the network interface unit 606 may also be utilized to connect to other types of networks and remote computer systems. In addition, the network interface unit 606 can be used in addition with, or in lieu of, the local network interface unit. Thus, it is possible that the System Controller 110, DPC 120, and DTC 125 may be remotely located from each other and communicate via a network.

The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6). Thus, it is possible that the system controller 110, DPC 120, and DTC 125 may be remotely located from each other and communicate via a network.

Finally, the computer 600 may include in one embodiment a display/touch screen 615. This can be used to present information to the user, as well as to receive touch input signals associated with a function key or other input presented to the user as part of the graphical user interface.

A number of program modules and data files may be stored in the mass storage device 610 and RAM 614 of the computer 600, including an operating system 618 suitable for controlling the operation of the computer. The mass storage device 610 and RAM 614 may also store one or more program modules. In particular, the mass storage device 610 and the RAM 614 may store a system control module 625 of instructions for accomplishing the functions of the system controller as described above. The mass storage device 610 and the RAM 614 may also store other types of program modules. For example, the program modules may involve receiving and processing of certain inputs, such as sensor values or power commands. The mass storage device 610 may also store other modules, such as data logging.

The control architecture described above offers a simple, symmetric power converter architecture for bi-directional power conversion. The architecture allows for unity power factor power conversion to meet power quality requirements and direct torque control for variable speed machine drive. Further, the system provides a fast dynamic response, independent real and reactive power control, bi-directional power flow, and accommodates variable frequency and synchronized front and back converter control.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method for controlling power transfer comprising:
   receiving a power command value indicating a desired power level to be transferred from an energy storage sub-system;
   receiving an input comprising a rotational speed of a rotating mass of the energy storage sub-system;
   calculating a torque directly from the power command value and the rotational speed of the rotating mass, wherein the calculated torque represents an amount of torque that must be generated by the rotating mass to achieve the desired power level;
   determining whether the calculated torque exceeds a maximum allowed torque;
   defining an adjusted torque as the maximum allowed torque threshold if the calculated torque exceeds the maximum allowed torque threshold and as the calculated torque if the calculated torque does not exceed the maximum allowed torque threshold;
   providing the adjusted torque to a direct torque controller for controlling a torque of the rotating mass;
   determining an active power value based on the rotational speed of the rotating mass and the adjusted torque to provide to a direct power controller;
   selectively activating, using the direct power controller, a first plurality of switches to regulate an alternating current (AC) power source; and
   selectively activating, using the direct torque controller, a second plurality of switches to control a motor coupled to the rotating mass, wherein the first plurality of switches and second plurality of switches are coupled in parallel between two direct current (DC) links.

2. The method of claim 1, wherein determining the adjusted active power comprises:
   receiving a measured DC link voltage value;

summing the measured DC link voltage value with a reference DC link voltage value to determine an active power correction value; and using the active power correction value to determine the adjusted active power.

3. The method of claim 2, further comprising:
providing a reactive power reference signal to the direct power controller.

4. The method of claim 2, wherein the direct power controller comprises a converter comprising the first plurality of switches.

5. The method of claim 4, wherein the direct torque controller comprises an inverter comprising the second plurality of switches.

6. The method of claim 1, wherein the energy storage sub-system comprises a permanent magnet synchronous motor and wherein a reactive power reference signal is not provided to the direct torque controller.

7. The method of claim 1, wherein using the rotational speed of the rotating mass and the adjusted torque to determine an active power value comprises:
multiplying the rotational speed of the rotating mass to the adjusted torque to determine the active power value.

8. A system for controlling transfer of power between and an AC energy source and an energy storage sub-system comprising:
a direct power controller for controlling energy transfer associated with the AC energy source, wherein the direct power controller is configured to selectively activate a first plurality of switches to regulate an AC power source;
a direct torque controller for controlling energy transfer associated with the energy storage sub-system comprising a rotating mass, wherein the direct torque controller is configured to selectively activate a second plurality of switches to control a motor coupled to the rotating mass, wherein the first plurality of switches and second plurality of switches are coupled in parallel between two DC links; and
a system controller comprising a processor configured to:
receive a power command indicating a desired amount of power to be transferred,
receive a rotational speed of the rotating mass,
calculate a torque directly from the power command and the rotational speed, wherein the calculated torque represents an amount of torque that must be generated by the rotating mass to transfer the desired amount of power,
provide the calculated torque to the direct torque controller,
determine an active power reference signal based on the calculated torque, and
provide the active power reference signal to the direct power controller.

9. The system of claim 8, wherein the system controller further comprises:
a memory for storing a measured value of the rotational speed of the rotating mass.

10. The system of claim 9, wherein the processor is further configured to:
determine a measured DC link voltage value; and
calculate the active power reference signal to the direct power controller using the measured DC link voltage value and a reference DC link voltage value.

11. The system of claim 10, wherein the active power reference signal is determined using a calculation from a proportional-integral-derivative controller using the measured DC link voltage value and the reference DC link voltage value.

12. The system of claim 9, wherein the first plurality of switches comprises six switching assemblies that are selectively activated in response to the active power reference signal.

13. The system of claim 12, wherein the second plurality of switches comprises six switching assemblies that are selectively activated in response to the calculated torque.

14. The system of claim 8, wherein the calculated torque is evaluated to determine if the calculated torque exceeds a maximum torque level.

15. A computer readable medium storing instructions which, when executed, cause a processor to:
receive a power transfer value indicating a desired power level to be transferred from an energy storage sub-system to an energy source;
receive a rotational speed value of a rotating mass;
calculate a torque directly from the power transfer value and the rotational speed, wherein the calculated torque represents an amount of torque that must be generated by the rotating mass to achieve the desired power level;
provide the calculated torque to a direct torque controller controlling a rotating mass-based power storage system;
provide an active power reference value based on the calculated torque to a direct power controller controlling power transferred with the rotating mass-based power storage system;
selectively activate, using the direct power controller, a first plurality of switches to regulate an AC power source; and
selectively activate, using the direct torque controller, a second plurality of switches to control a motor coupled to the rotating mass, wherein the first plurality of switches and second plurality of switches are coupled in parallel between two DC links.

16. The computer readable medium of claim 15, further comprising instructions for:
limiting the calculated torque associated with the desired power level using a maximum allowable torque.

17. The computer readable medium of claim 15, further comprising instructions for:
modifying the active power reference signal using an active power correction value.

18. The computer readable medium of claim 17, wherein the active power correction value is based on a result of summing a measured DC link voltage value with a reference DC link voltage value.

19. The computer readable medium of claim 15, further comprising:
receiving measurements for a voltage and current for each phase of a plurality of phases controlled by the direct power controller;
receiving a phase angle measurement value of one of the plurality of phases; and
using a first switching table to ascertain a first switching vector to activate the first plurality of switches for the plurality of phases controlled by the direct power controller.

20. The computer readable medium of claim 19, further comprising:
receiving measurements for a voltage for each phase of a plurality of phases controlled by the direct torque controller;

receiving a phase angle measurement value of one of the plurality of phases controlled by the direct torque controller; and using a second switching table to ascertain a second switching vector to activate the second plurality of switches for the plurality of phases controlled by the direct torque controller.

* * * * *